(12) United States Patent
Huang

(10) Patent No.: US 7,893,654 B2
(45) Date of Patent: Feb. 22, 2011

(54) CONSTANT-CURRENT, CONSTANT-VOLTAGE AND CONSTANT-TEMPERATURE CURRENT SUPPLY OF A BATTERY CHARGER

(75) Inventor: Chi-Chia Huang, Taipei (TW)

(73) Assignee: Elite Micropower Inc., Hsinchu County (TW)

( * ) Notice: Subject to any disclaimer, the term of this patent is extended or adjusted under 35 U.S.C. 154(b) by 473 days.

(21) Appl. No.: 12/121,795

(22) Filed: May 16, 2008

(65) Prior Publication Data

US 2009/0058393 A1 Mar. 5, 2009

Related U.S. Application Data

(60) Provisional application No. 60/969,649, filed on Sep. 3, 2007.

(51) Int. Cl.
*H02J 7/00* (2006.01)
(52) U.S. Cl. ........................................ 320/107; 320/128
(58) Field of Classification Search .................. 320/107, 320/128
See application file for complete search history.

(56) References Cited

U.S. PATENT DOCUMENTS

| | | | |
|---|---|---|---|
| 6,522,118 B1 | 2/2003 | Barcelo et al. | |
| 6,570,372 B2 | 5/2003 | Barcelo et al. | |
| 6,700,364 B2 | 3/2004 | Barcelo et al. | |
| 6,819,094 B2 | 11/2004 | Barcelo et al. | |
| 2004/0075417 A1* | 4/2004 | Aradachi et al. | 320/107 |
| 2006/0076921 A1* | 4/2006 | Kubota et al. | 320/107 |

* cited by examiner

*Primary Examiner*—Adolf Berhane
*Assistant Examiner*—Yemane Mehari
(74) *Attorney, Agent, or Firm*—Jianq Chyun IP Office

(57) ABSTRACT

Provided is a current supply for providing a charge current to a load. The current supply includes: a driving transistor, providing the charge current to the load; a sensing transistor, limiting the charge current; a pulling low transistor, pulling low a controlling node which controls the driving transistor and the sensing transistor; a constant voltage controller, pulling up the controlling node, controlling the conduction state of the driving transistor and accordingly maintaining the voltage across the load at the first reference voltage, when a voltage across the load rises up and comes close to a first reference voltage; and a constant current controller, controlling the controlling node and the pulling low transistor to limit the charge current to be constantly provided to the load, when the voltage across the load drops much lower than the first reference voltage.

21 Claims, 6 Drawing Sheets

CONSTANT-CURRENT, CONSTANT-VOLTAGE AND CONSTANT-TEMPERATURE CURRENT SUPPLY OF A BATTERY CHARGER

CROSS-REFERENCE TO RELATED APPLICATION

This application claims the priority benefit of U.S.A. provisional application Ser. No. 60/969,649, filed on Sep. 3, 2007, all disclosures are incorporated therewith.

BACKGROUND OF THE INVENTION

1. Field of Invention

The present invention relates to a current supply of a charger. More specifically, the present invention relates to a constant current (CC), constant voltage (CV) and constant temperature (CV) current supply of a rechargeable battery charger.

2. Description of Related Art

Batteries are used in a wide variety of portable devices such as laptop computers, cellular telephones, personal digital assistants (PDAs), radios, radiophones, stereo cassette tape players, etc. Two types of batteries are available: rechargeable and non-rechargeable. They exhibit different end of life voltage characteristics and effective series resistances. Non-rechargeable battery, e.g., alkaline battery, should not be subjected to recharging attempts. Rechargeable batteries, e.g., nickel-cadmium (Ni—Cd), nickel-hydrogen (Ni—H), lithium-ion, and nickel metal-hydride (Ni—MH) batteries, should be charged at different rates using different conditions.

These electronic devices powered by the rechargeable battery are typically plugged into the battery chargers when the rechargeable battery is in a low charge state.

FIG. 1 shows operation condition of a charger. Under Constant Voltage (CV) mode, the battery voltage is near the final voltage; and the charging current is close to 0. Under Constant Current (CC) mode, the battery voltage drops much below the final voltage; and the charging current equals preset value. Further, under constant temperature mode, the power dissipated by the charger is controlled such that the temperature inside the charger is kept constant.

FIG. 2 and FIG. 3 show prior control circuits for a conventional charger. The control circuit in FIG. 2 at least includes a resistor 110, voltage-controlled current sources 120 and 130, amplifiers 140 and 150 and a priority circuit 160.

As shown in FIG. 2, the priority circuit 160 has two inputs, A and B, and an output, Out. The priority circuit 160 connects the lower of the two inputs, A or B, to the output, Out. Therefore, the current flowing in the voltage-controlled current source 120 and in voltage-controlled current source 130 is equal to either the current required to develop V1 across the resistor 110 or the current required to develop V2 across the load Z1, whichever current is lower in magnitude. Voltage node, V3, also preferably continuously provides information regarding the magnitude of the charging current at all times. The higher magnitude current may be selected to charge the load.

The operating conditions of the control circuit in FIG. 2 are as follows. The load is a discharged battery, "V1/R110" (R110 refer to the resistance of the resistor 110) is equal to the desired charging current, and V2 is equal to the desired final float potential of the battery. When charging begins, V4, the voltage across the battery, is much lower than V2, and the output of amplifier 150 slews to the positive supply rail because amplifier 150 is requesting maximum current.

Then, the priority circuit 160 connects the output of amplifier 140 to the control voltage of the current sources and ignores the output of amplifier 150. Then, the current V1/R110 is delivered to the load Z1.

As the battery is charged and V4 approaches V2, the output of the amplifier 150 begins to drop. When the battery voltage V4 reaches V2, the current required by the load to maintain this voltage begins to drop below V1/R110. Amplifier 140 tries to force the current V1/R110 into the battery, but this causes V4 to rise above V2 which causes the output of amplifier 150 to fall quickly. The drop in the output of amplifier 150 causes the priority circuit 160 to choose the output of amplifier 150 as the controlling voltage for the current sources. At this point, the output of amplifier 140 is ignored. The current required by the load to maintain V4=V2 is less than the current V1/R110, so the voltage across resistor 110, labeled V3, falls below V1 and the output of amplifier 140 slews to the positive rail, and the priority circuit 160 continues to select the constant voltage loop to provide current to the load Z1. In summary, the current delivered to the load Z1 is preferably equal to V1/R110 until the voltage across the load Z1 reaches about V2. Then, the current delivered to the load Z1 is reduced in order to maintain V2 across the load Z1. This completes the constant-current/constant-voltage charging cycle.

Now please refer to FIG. 3. PMOS transistors 210 and 220 function as the voltage controlled current sources. Two diodes 230 and 240 and a pull-down current source 250 perform a diode- or function to implement the priority function performed by the priority circuit 160 in FIG. 2.

Circuit shown in FIG. 3 operates as follows. The gates of PMOS transistors 210 and 220 are coupled to the diodes 230 and 240. In addition, it is well known in the art that increasing gate voltage of a PMOS transistor, while holding the source fixed, decreases the drain-source current of a PMOS transistor. It follows that, whereas voltage-controlled current sources 120 and 130 provide higher current in response to a higher voltage, PMOS transistors 210 and 220 provide lower current in response to higher voltage. Furthermore, amplifiers 140 and 150 in FIG. 3 are connected in opposite polarity from the amplifiers 140 and 150 shown in FIG. 2.

In the constant current phase of circuit in FIG. 3, when the voltage across the load Z1 is less than V2, amplifier 140 sets the current V1/R110 to the load. The output of amplifier 140 is preferably the voltage required to force the non-inverting input of amplifier 140 to have a voltage V3 equal to V1. During this constant current phase of the circuit, the output of amplifier 150 is at the negative rail voltage. This negative rail voltage at the output of amplifier 150 is prevented from affecting the gate voltage of PMOS transistors 210 and 220 by diode 240. Therefore, the output of amplifier 140 controls the current to the load during this phase.

In the constant voltage phase of the circuit in FIG. 3, when the voltage across the load is at or above V2, amplifier 150 sets the current to the load such that this current is preferably less than V1/R110. During this constant voltage phase of the circuit, the output of amplifier 140 is at the negative rail voltage. This negative rail voltage at the output of amplifier 140 is prevented from affecting the gate voltage of PMOS transistors 210 and 220 by diode 230. Therefore, the output of amplifier 150 controls the current to the load during this phase.

It has been shown that, whichever output voltage from amplifiers 140 and 150 is higher, it controls the charging current to the load. Thus, one function of diodes 230 and 240 and PMOS transistors 210 and 220 is to select the higher output value of amplifiers 140 and 150 to provide the lower available or requested current to the load. Pull down current source 250 sets the base-line voltage of the gates of PMOS transistors 210 and 220 to zero so the higher output of the amplifiers can be used to accurately set the voltage of the gates.

Optimally, V1 is equal to V3 in the constant current phase. However, due to the limited gain of amplifier 140, an offset voltage Δ1 exists between V1 and V3 for the amplifier 140 to generate its output. If amplifier 140 is designed with zero systematic offset, the offset voltage Δ1 mainly comes from the mismatching of driving capabilities between diode 230 and current source 250. Since diode 230 and current source 250 have different control signals, their driving capabilities are not generally well matched. Process variation can worsen the mismatch between diode 230 and current source 250, thus increases the offset voltage Δ1. What's worse is that, in most cases, resistor 110 is an external component outside the chip, and the pole created by the resistor 110 and parasitic capacitor at node V3 prevents the using of high gain amplifier for 140 for fear of instability. Low gain for amplifier 140 can result in high offset voltage Δ1. Therefore, the charge current into the load (i.e. the battery) is not precisely enough.

Optimally, V2 is equal to V4 in the constant voltage phase. However, due to the limited gain of amplifier 150, an offset voltage Δ2 exists between V2 and V4 for the amplifier 150 to generate its output. If amplifier 150 is designed with zero systematic offset, the offset voltage Δ2 mainly comes from the mismatching of driving capabilities between diode 240 and current source 250. Since diode 240 and current source 250 have different control signals, their driving capabilities are not generally well matched. Process variation can worsen the mismatch between diode 240 and current source 250, and thus increases the offset voltage Δ2 and deteriorates the accuracy of the final voltage of the battery.

SUMMARY OF THE INVENTION

The invention is directed to a current supply for a battery charger, which is capable of providing and operating under constant-current mode, constant-voltage mode and constant-temperature mode.

The invention is directed to a current supply for a battery charger, which is capable of providing precise charge currents into the battery.

The invention is directed to a current supply for a battery charger, with easy frequency compensation.

The invention is directed to a current supply for a battery charger, with reduced chip circuit area.

One example of the invention is related to a constant-current, constant-voltage and constant-temperature current supply for providing a charge current to a load. The current supply includes: a driving transistor, having a first terminal coupled to a power supply, a control terminal coupled to a node, and a second terminal coupled to the load, the driving transistor for providing the charge current to the load; a sensing transistor, having a first terminal coupled to the power supply, a control terminal coupled to the node, and a second terminal; a pulling low transistor, having a first terminal, a control terminal, and a second terminal coupled to the node, the pulling low transistor being for pulling low the node; a constant voltage controller, coupled to the driving transistor, the sensing transistor and the pulling low transistor, wherein when a voltage across the load rises up and comes close to a first reference voltage, the constant voltage controller pulls up the node, controls the conduction state of the driving transistor and accordingly maintains the voltage across the load at the first reference voltage; and a constant current controller, coupled to the driving transistor, the sensing transistor, the pulling low transistor and the constant voltage controller, wherein when the voltage across the load drops much lower than the first reference voltage, the constant current controller controls the node via a first pulling high transistor and the pulling low transistor and thus limits the charge current to be constantly provided to the load.

Another example of the invention is related to a constant-current, constant-voltage and constant-temperature current supply for providing a charge current to a load. The current supply includes: a driving transistor, having a first terminal coupled to a power supply, a control terminal coupled to a node, and a second terminal coupled to the load, the driving transistor for providing the charge current to the load; a sensing transistor, having a first terminal coupled to the power supply, a control terminal coupled to the node, and a second terminal; a pulling low transistor, having a first terminal, a control terminal, and a second terminal coupled to the node, the pulling low transistor being for pulling low the node; a constant voltage controller, coupled to the driving transistor, the sensing transistor and the pulling low transistor, wherein when a voltage across the load rises up and comes close to a first reference voltage, the constant voltage controller pulls up the node, controls the conduction state of the driving transistor and accordingly maintaining the voltage across the load at the first reference voltage; a constant current controller, coupled to the driving transistor, the sensing transistor, the pulling low transistor and the constant voltage controller, wherein when the voltage across the load drops much lower than the first reference voltage, the constant current controller controls the node via a first pulling high transistor and the pulling low transistor and thus limits the charge current to be constantly provided to the load; and a constant power controller, coupled to the constant current controller, for adjusting the power dissipated by the driving transistor and for reducing the charge current when a die temperature of the current supply raises.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
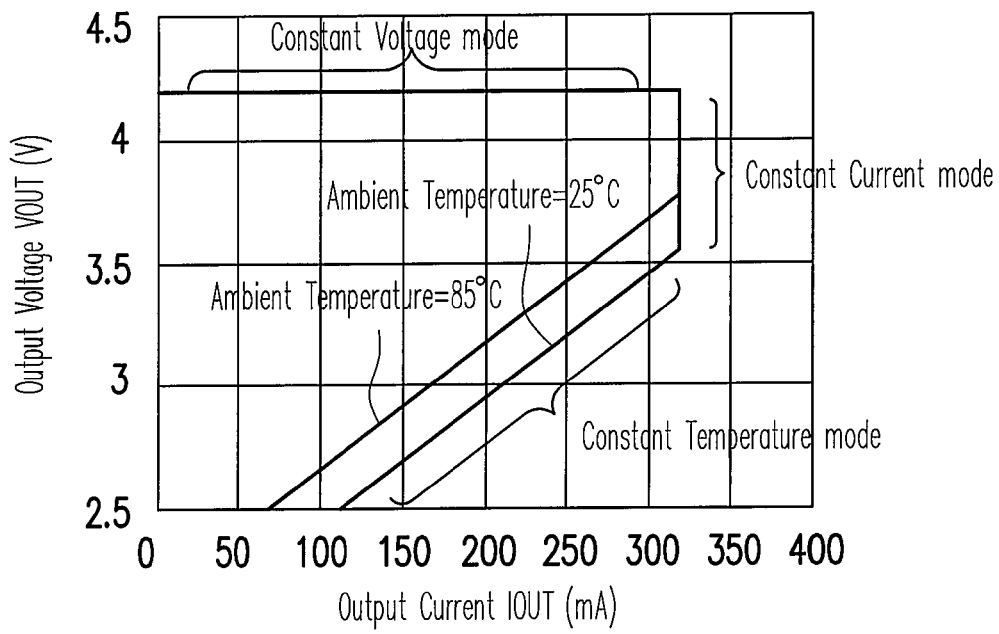
FIG. 1 shows operation condition of a charger.
Figure 2:
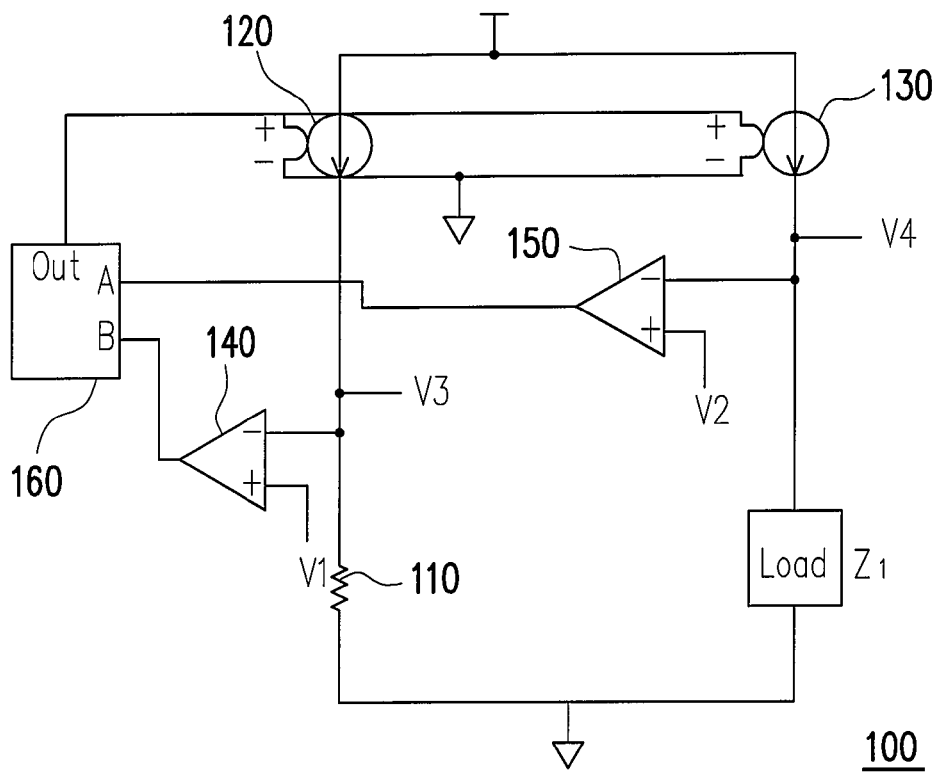
FIG. 2 and FIG. 3 respectively show a prior control circuit for a conventional charger.
Figure 3:
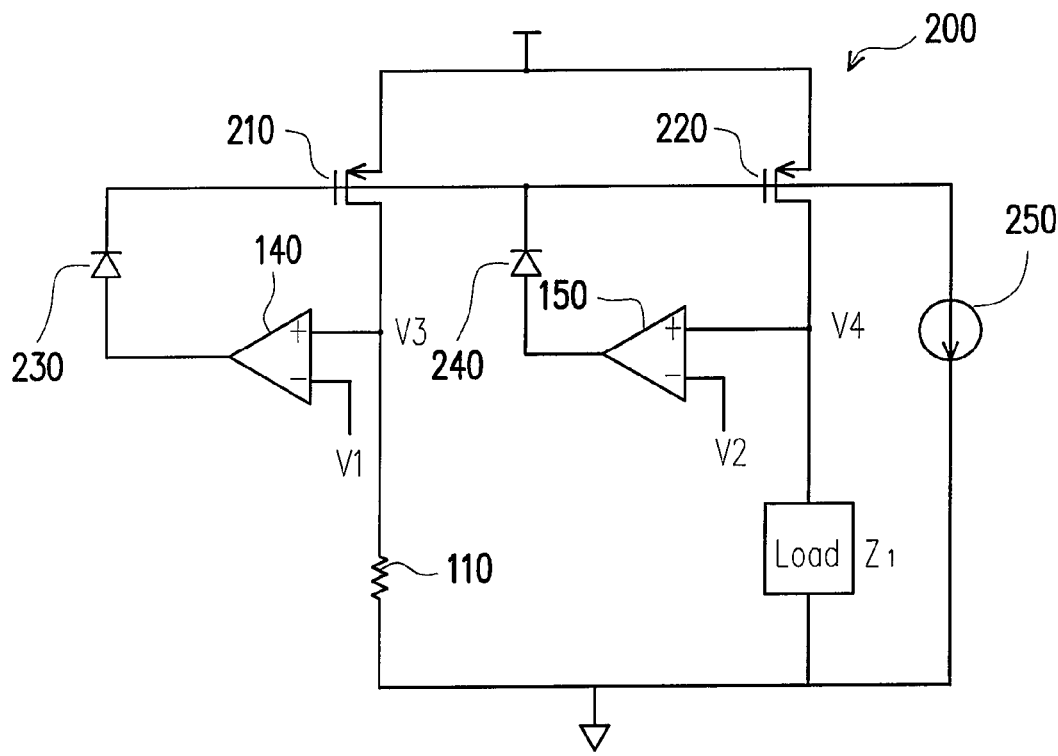

Reference will now be made in detail to the present embodiments of the application, examples of which are illustrated in the accompanying drawings. Wherever possible, the same reference numbers are used in the drawings and the description to refer to the same or like parts.

First Embodiment

Figure 4:
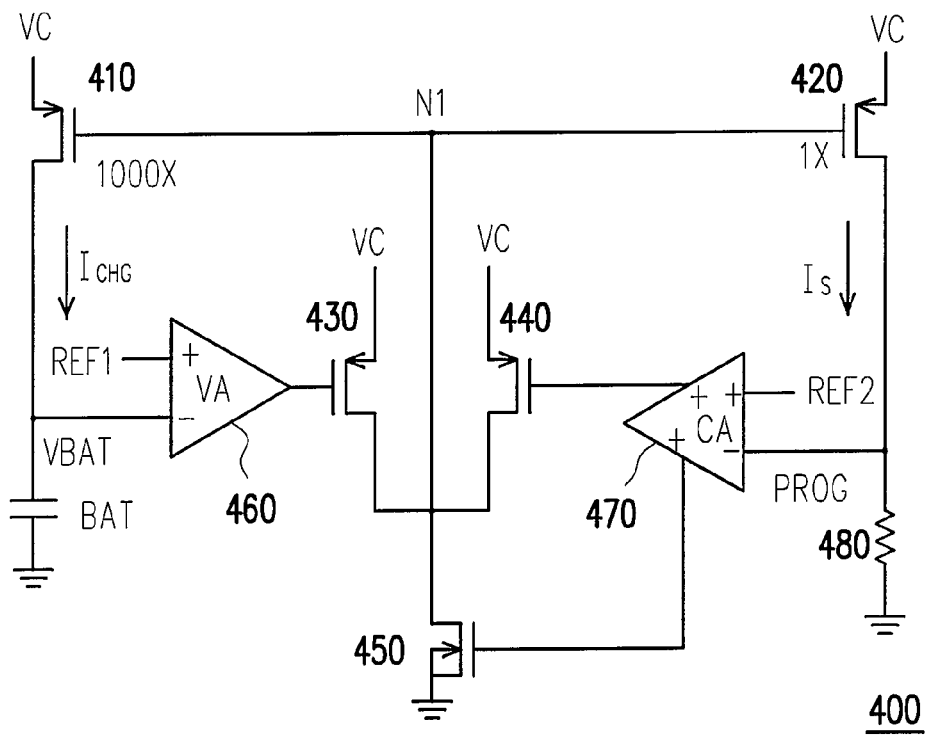
FIG. 4 shows a constant current and constant voltage current supply of a charger according to a first embodiment of the invention.

FIG. 4 shows a constant current and constant voltage current supply of a charger according to a first embodiment of the invention. The constant current and constant voltage current supply according to the first embodiment of the invention provides a charge current $I_{CHG}$ to a load. The load is for example, a rechargeable battery BAT. The constant current and constant voltage current supply 400 according to the first embodiment includes: a driving transistor 410, a sensing transistor 420, a pulling low transistor 450, a constant voltage controller, a constant current controller and an external resistor 480. The constant voltage controller at least includes an operation amplifier 460 and a PMOS transistor 430. The constant current controller at least includes an operation amplifier 470 and a PMOS transistor 440. The operation amplifier 460 may be a voltage amplifier. The operation amplifier 470 may be a current amplifier.

The driving transistor 410 has a source terminal coupled to a power supply VC, a gate terminal coupled to a node N1, and a drain terminal coupled to the load BAT. The driving transistor 410 is for providing the charge current $I_{CHG}$ to the load BAT. The driving transistor 410 is for example a PMOS transistor.

The sensing transistor 420 has a source terminal coupled to the power supply VC, a gate terminal coupled to the node N1 and a drain terminal coupled to the current amplifier 470 and the resistor 480.

The pulling low transistor 450 has a source terminal coupled to GND, a gate terminal coupled to an output terminal of the current amplifier 470 and a drain terminal coupled to the node N1. The pulling low transistor 450 is for pulling low the node N1 to GND. The pulling low transistor 450 is for example an NMOS transistor.

The constant voltage controller is coupled to the driving transistor 410, the sensing transistor 420 and the pulling low transistor 450. The constant current controller is coupled to the driving transistor 410, the sensing transistor 420, the pulling low transistor 450 and the constant voltage controller.

The PMOS transistor 430 is a pulling high transistor. The PMOS transistor has a source terminal coupled to the power supply VC, a gate terminal coupled to an output of the voltage amplifier 460 and a drain terminal coupled to the node N1. The pulling high transistor 430 is for pulling high the node N1.

The voltage amplifier 460 has a first input terminal coupled to the reference voltage REF1, a second input terminal coupled to the load BAT, and an output terminal coupled to the gate terminal of the pulling high transistor 430. In other words, the voltage amplifier 460 compares the reference voltage REF1 with the output voltage VBAT of the load BAT, to control driving capability of the transistor 430.

The PMOS transistor 440 is also a pulling high transistor. The PMOS transistor 440 has a source terminal coupled to the power supply VC, a gate terminal coupled to another output terminal of the current amplifier 470 and a drain terminal coupled to the node N1. The PMOS transistor 440 is also for pulling high the node N1.

The current amplifier 470 has a first input terminal coupled to another reference voltage REF2, a second input terminal coupled to the resistor 480, a first output terminal coupled to the gate terminal of the PMOS transistor 440 and a second output terminal coupled to the gate terminal of the pulling low transistor 450. Voltage PROG is a voltage across the resistor 480. In other words, the current amplifier 470 compares the reference voltage REF2 with the voltage PROG to control driving capabilities of the transistors 440 and 450.

In general, the voltage at the node N1 will be pulled up by the transistors 430 and 440. When a voltage across the load BAT rises up and comes close to a reference voltage REF1 (i.e. the charger is operated at constant voltage mode), the transistor 430 will be slightly turned-on by the amplifier 460 and accordingly the voltage at the node N1 will be slightly raised. While, the driving transistor 410 is weakly turned on to charge the load BAT until the voltage VBAT across the load BAT is substantially the same as the reference voltage REF1. In other words, the constant voltage controller pulls up the node N1, controls the conduction state of the driving transistor 410. Accordingly, the voltage VBAT across the load BAT is to be substantially maintained at the reference voltage REF1 under constant voltage mode.

On the contrary, when the voltage VBAT across the load BAT drops much lower than the reference voltage REF1 (i.e. the charger is operated at constant current mode), the transistor 430 will be turned-off by the amplifier 460 while the voltage at the node N1 will be pulled low to GND by the transistor 450. So, the transistors 410 and 420 will be turned ON and the voltage PROG will be raised up by the current Is. If the voltage PROG becomes higher than the reference voltage REF2, driving capabilities of transistors 440 and 450 will be increased and decreased, respectively and simultaneously, to raise the voltage at the node N1. After loop regulation performed by the amplifier 470, the voltage PROG is almost the same as the reference voltage REF2, i.e. Is≈REF2/R480 (R480 referring to resistance of the resistor 480). In this embodiment, the size ratio (i.e. W/L ratio of channel) between the transistor 410 and the transistor 420 is 1000:1. So that, $I_{CHG}$≈1000*Is≈1000*(REF2/R480). This means, under constant current mode, the charge current $I_{CHG}$ will be limited.

Figure 5:
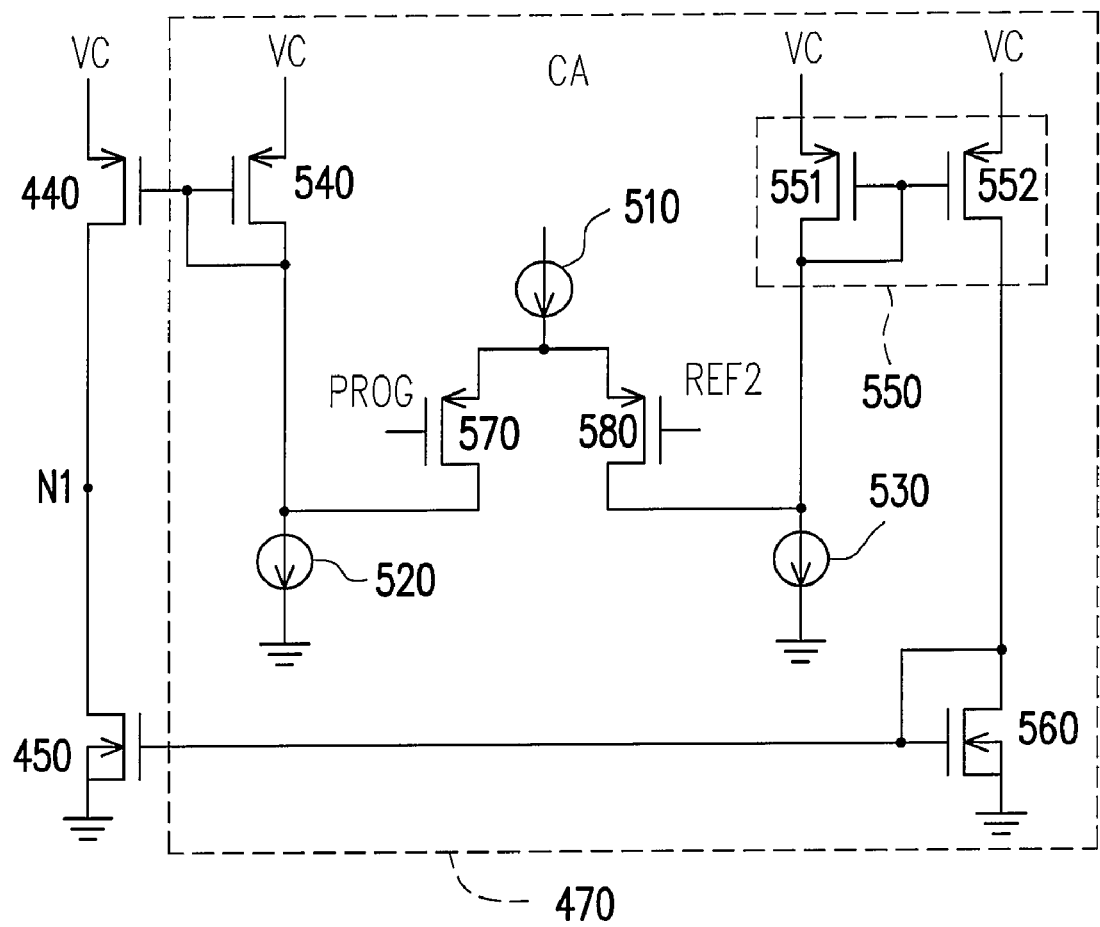
FIG. 5 shows a circuit diagram of a current amplifier in FIG. 4.

FIG. 5 shows a circuit diagram of the current amplifier 470 in FIG. 4. As shown in FIG. 5, the current amplifier 470 includes: current sources 510, 520 and 530; a current mirror 550; transistors 540, 560, 570 and 580.

The transistor 570, for example, a PMOS transistor, has a source terminal coupled to the constant current source 510, a gate terminal being as the second input terminal of the constant current amplifier 470, and a drain terminal coupled to the constant current source 520.

The transistor 580, for example, a PMOS transistor, has a source terminal coupled to the constant current source 510, a gate terminal being as the first input terminal of the constant current amplifier 470, and a drain terminal coupled to the constant current source 530.

The transistor 540, for example, a PMOS transistor, has a source terminal coupled to the power supply VC, a gate terminal being as the first output terminal of the constant current amplifier 470, and a drain terminal coupled to the constant current source 520. Besides, the drain terminal of the transistor 540 is further coupled to the gate terminal thereof. The transistor 540 and the transistor 440 form a current mirror.

The transistor 560, for example, an NMOS transistor, has a source terminal coupled to GND, a gate terminal for being as the second output terminal of the constant current amplifier 470, and a drain terminal coupled to the gate terminal thereof.

The current mirror 550 is coupled to the power supply VC, the constant current source 530, and the drain terminal of the transistor 560. The first current mirror 550 includes: transistors 551 and 552. The transistor 551, for example, a PMOS transistor 551, has a source terminal coupled to the power supply VC, a gate terminal coupled to the constant current source 530, and a drain terminal coupled to the constant current source. The transistor 552, for example a PMOS transistor, has a source terminal coupled to the power supply VC, a gate terminal coupled to the constant current source 530, and a drain terminal coupled to the drain terminal of the transistor 560.

Second Embodiment

Figure 6:
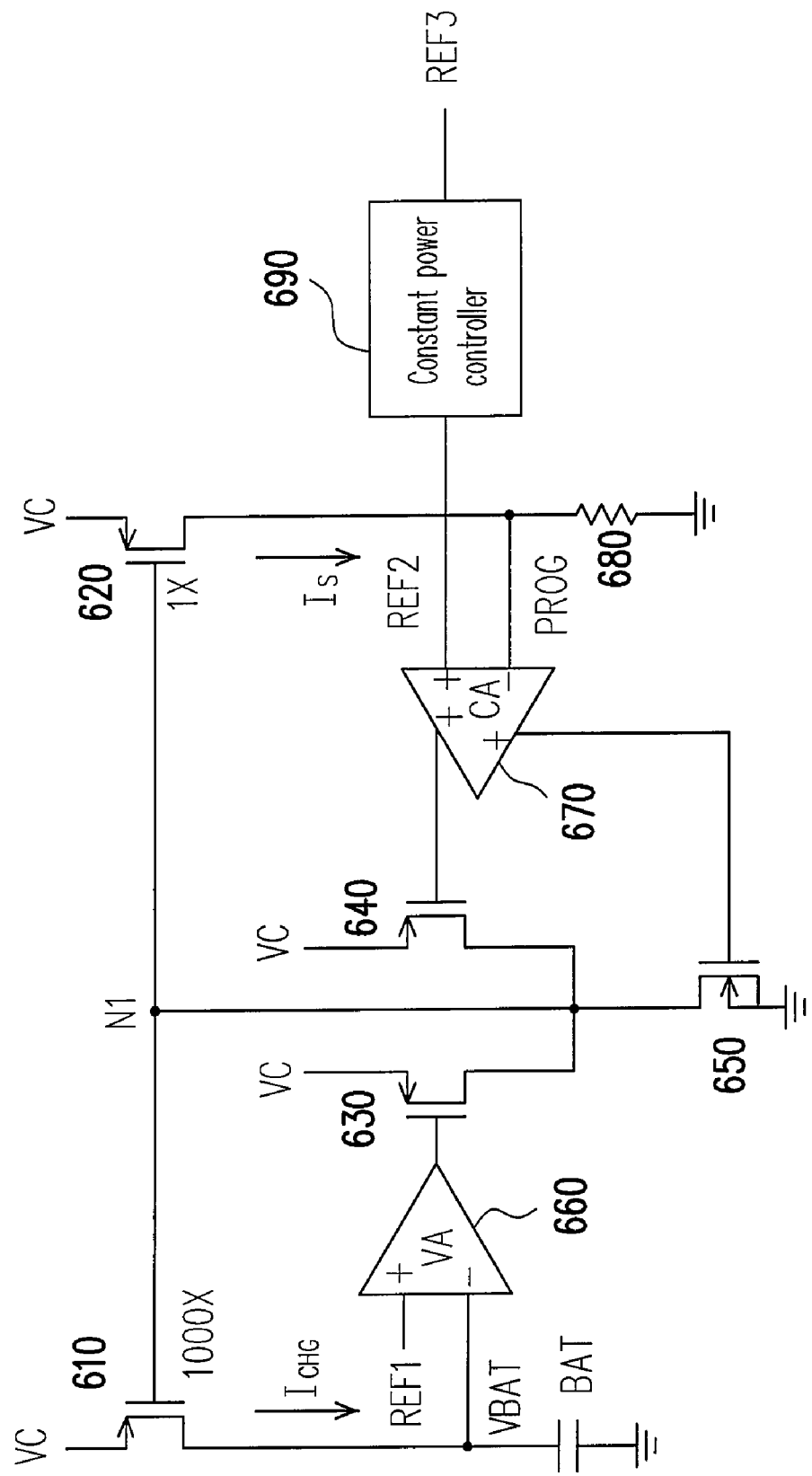
FIG. 6 shows a constant current, constant voltage and constant temperature current supply of a charger according to a second embodiment of the invention.

FIG. 6 shows a constant current, constant voltage and constant temperature current supply of a charger according to a second embodiment of the invention. In the first and second embodiment, similar elements have similar reference symbols and the details are omitted for simplification.

In the second embodiment, a constant power controller 690 is used for generating and controlling the reference voltage REF2 to achieve thermal regulation. In constant current phase, the driving transistor 610 may dissipate several watts of power and cause a surge in die temperature. To prevent thermal run away, power dissipation of the driving transistor 610 must be limited when the die temperature reached a preset value Tp. If the die temperature increased above Tp, the constant power controller 690 will pull low the reference voltage REF2 to reduce the charge current $I_{CHG}$ provided by the driving transistor 610. This will reduce the power dissipated by the driving transistor 610 and accordingly lower the die temperature to Tp.

Figures 7, 8:
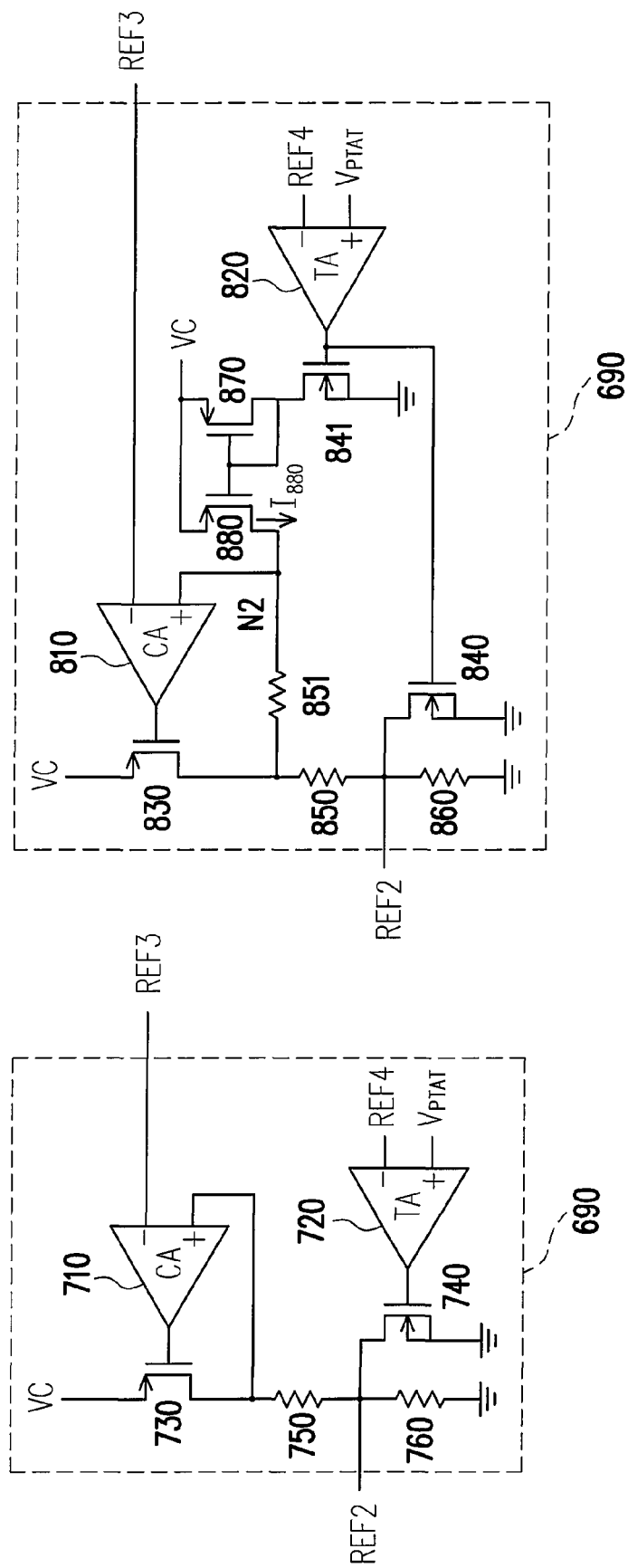
FIG. 7 and FIG. 8 show two examples of the constant power controller.

FIG. 7 and FIG. 8 show two examples of the constant power controller 690.

Refer to FIG. 7, the constant power controller 690 includes: operation amplifiers 710 and 720; transistors 730 and 740; and a voltage divider including resistors 750 and 760.

The operation amplifier 710 has a first input terminal coupled to still another reference voltage REF3, a second input terminal coupled to the transistor 730 and the voltage divider and an output terminal coupled to the transistor 730. The output of the operation amplifier 710 controls driving capability of the transistor 730.

The transistor 730, for example a PMOS transistor, has a source terminal coupled to the power supply VC, a gate terminal coupled to the output terminal of the operation amplifier 710, and a drain terminal coupled to the second input terminal of the operation amplifier 710.

The operation amplifier 720 has a first input terminal coupled to yet another reference voltage REF4, a second input terminal coupled to a positive temperature coefficient voltage $V_{PTAT}$ and an output terminal coupled to the transistor 740. The output of the operation amplifier 720 controls driving capability of the transistor 740. For example, when the die temperature is lower than Tp, the reference voltage REF4 is higher than the positive temperature coefficient voltage $V_{PTAT}$, so that the transistor 740 is OFF. On the contrary, when the die temperature is above Tp, the positive temperature coefficient voltage $V_{PTAT}$ may raise higher than the reference voltage REF4, so that the transistor 740 is turned ON. The more the die temperature is above Tp, the stronger the driving capability transistor 740 has.

The transistor 740, for example an NMOS transistor, has a source terminal coupled to GND, a gate terminal coupled to the output terminal of the operation amplifier 720, and a drain terminal coupled to the reference voltage REF2.

The voltage divider has serially-connected resistors 750 and 760.

When the die temperature is below Tp, the transistor 730 is ON while the transistor 740 is OFF. The voltage divider is for dividing a voltage at the second input terminal of the operation amplifier 710 to provide the reference voltage REF2. In other words, under this case, REF2=REF3*R760/(R760+R750), wherein R750 and R760 refer to resistances of resistors 750 and 760 respectively.

On the other hand, when the die temperature rises above Tp, the reference voltage REF2 is pulled low by the transistor 740 (i.e. REF2=$V_{DS}$ of the transistor 740 under this case). As known, after the loop becomes stable by the current amplifier 670 (refer to FIG. 6), PROG=REF2 and Is =PROG/R680 (R680 refers to resistance of the resistor 680). So if the reference voltage REF2 is lowered, then the current Is is lowered, and accordingly the charge current $I_{CHG}$ is also lowered. In other words, when the die temperature rises above Tp, the charge current $I_{CHG}$ is lowered and accordingly the power dissipation of the driving transistor 610 is reduced, so that the die temperature is to be kept constantly at Tp.

Refer to FIG. 8, the constant power controller 690 includes: operation amplifiers 810 and 820; transistors 830, 840, 841, 870 and 880; and a voltage divider. In FIG. 7 and FIG. 8, similar elements have similar reference symbols and their detailed description is omitted here.

The transistor 841, for example an NMOS transistor, has a source terminal coupled to GND, a gate terminal coupled to the output terminal of the operation amplifier 820, and a drain terminal coupled to the gate terminals of the transistors 870 and 880.

The transistors 870 and 880 form a current mirror, which is coupled to the power supply VC, the second input terminal of the operation amplifier 810, and the drain terminal of the transistor 841.

The voltage divider has resistors 851, 850 and 860. The resistor 851 is coupled between the drain terminal of the transistor 830 and the second input terminal of the operation amplifier 810.

When the die temperature is below Tp, the transistor 830 is ON while the transistors 840, 841, 870 and 880 are OFF. The voltage divider is for dividing a voltage at the second input terminal of the operation amplifier 810 to provide the reference voltage REF2. In other words, under this case, REF2=REF3*R860/(R860+R850+R851), wherein R850, R860 and R851 refer to resistances of resistors 850, 860 and 851 respectively.

If the die temperature rises above Tp, both transistors 840 and 841 turn on. The turn-on of transistor 840 is for pulling down the reference voltage REF2 and accordingly reduce the charge current $I_{CHG}$ provided by the driving transistor 610. The turn-on of transistor 841 is for creating a current flowing through transistor 870. This current is mirrored by transistor 880 into a pull-up current I880, where I880 is the current flowing through the channel of transistor 880. I880 will create a voltage drop on resistor 851, pulling up the voltage at node N2 to above the reference voltage REF3. In response to this change in input offset voltage, amplifier 810 will increase its output voltage and reduces the driving capability of transistor 830 until the voltage at node N2 equals REF3. This process continues with rising temperature until transistor 830 is fully turned off.

Further, under high temperature case, the current flowing through the transistor 840, which is I880, is smaller than the current flowing through the transistor 740, which is REF3/R750. In other words, under high temperature case, the reference voltage REF2 in FIG. 8 is lower than the reference voltage REF2 in FIG. 7.

Refer to FIG. 4 and FIG. 6, resistors 480 and 680 are external components. So, a pole P1 is created by resistors 480 and 680 and the parasitic capacitor at node PROG. Since resistors 480 and 680 are used for charge current programming, their resistance can have hundreds of times of variation.

So, frequency of the pole P1 also has hundreds of times of variation. Therefore, P1 is not suitable as the dominant pole in the constant current regulation loop and an additional pole P2 is needed to serve as the dominant pole. Since P1 is not a dominant pole, it must be located above the unity gain frequency to ensure stability. One way to achieve this is pushing the dominant pole P2 to very low frequency. However, this requires a large capacitor to generate P2. A way for small chip size is using a low gain amplifier for current amplifiers 470 and 670. However, a low gain amplifier is susceptible to offset voltage. Therefore, in the embodiment, current amplifiers 470 and 670 are designed such that the outputs of amplifiers 470 and 670 simultaneously control the pulling high transistors 440, 640 and the pulling low transistors 450, 650. This forms a class-AB stage and a minimum offset can be achieved with low gain amplifier. On the other hand, outputs of the voltage amplifiers 460 and 660 control the pulling high transistors 430 and 630, which forms a class-A stage. However, the voltage amplifiers 460 and 660 may be high gain voltage amplifiers to reduce offset from class-A output stage thereof. Accompanied with the current amplifiers 470 and 670 having Class-AB output stage and the voltage amplifiers 460 and 660 having high gain voltage, better performance in current/voltage accuracy, small circuit size and common pole for AC compensation may be achieved according to embodiments of the invention. Other advantages of the above embodiment are for example, offset reduction in both CC mode and CV mode, and easy AC compensation.

Figure 9:
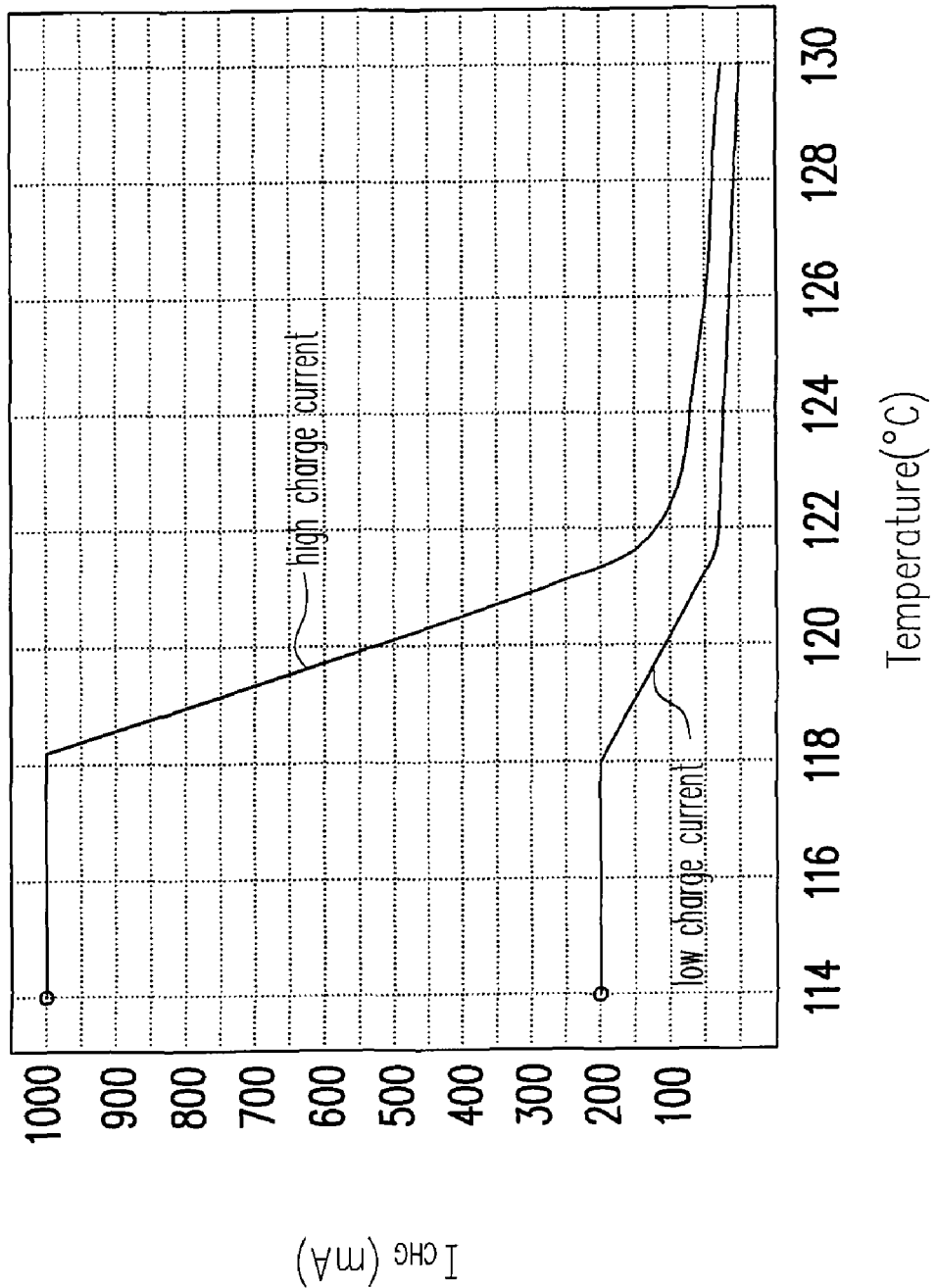
FIG. 9 shows characteristic curve diagram for the charge current $I_{CHG}$.

FIG. 9 shows characteristic curve diagram for the charge current $I_{CHG}$. The current flowing through the transistors 740 and 840 is PTAT (proportional to absolute temperature), which linearly pulls the reference voltage REF2 to nearly ground (exactly, $V_{DS}$ of the transistors 740 and 840) when the die temperature of the charger is above a preset value (ex. 118° C.). Since $I_{CHG}$=1000*REF2/R480, the charge current $I_{CHG}$ decreases linearly to 0.

Refer to FIG. 5, FIG. 7 and FIG. 8. When thermal regulation is in function, the reference voltage REF2 is pulled down by transistors 740 and 840 toward ground. The amplifier as shown in FIG. 5 has input dynamic range down to ground and functions well when the reference voltage REF2 is pulled toward zero.

Refer to FIG. 6, the constant power controller 690 is not directly coupled to the node N1. This simplifies AC compensation since node N1 is controlled by transistors 630, 640 and 650, no matter the constant power controller 690 is in function or not.

When the reference voltage REF2 decreases to a value such that the NMOS transistors 740 and 840 enter linear region, the decrease rate of the reference voltage REF2 (i.e. the charge current $I_{CHG}$) will slow down and the reference voltage REF2 (i.e. the charge current $I_{CHG}$) never goes zero. However, this situation only occurs at very high ambient temperature where a typical rechargeable battery can not survive. Therefore, in typical application it does not have to care about the condition where the charge current $I_{CHG}$ does not go zero.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A constant-current, constant-voltage and constant-temperature current supply for providing a charge current to a load, comprising:

a driving transistor, having a first terminal coupled to a power supply, a control terminal coupled to a node, and a second terminal coupled to the load, the driving transistor for providing the charge current to the load;

a sensing transistor, having a first terminal coupled to the power supply, a control terminal coupled to the node, and a second terminal;

a pulling low transistor, having a first terminal, a control terminal, and a second terminal coupled to the node, the pulling low transistor being for pulling low the node;

a constant voltage controller, coupled to the driving transistor, the sensing transistor and the pulling low transistor, wherein when a voltage across the load rises up and comes close to a first reference voltage, the constant voltage controller pulls up the node, controls the conduction state of the driving transistor and accordingly maintains the voltage across the load at the first reference voltage; and a constant current controller, coupled to the driving transistor, the sensing transistor, the pulling low transistor and the constant voltage controller, wherein when the voltage across the load drops much lower than the first reference voltage, the constant current controller controls the node via a first pull high transistor and the pulling low transistor and thus limits the charge current to be constantly provided to the load.

2. The current supply of claim 1, wherein the constant voltage controller comprising:

a second pulling high transistor, having a first terminal coupled to the power supply, a control terminal, and a second terminal coupled to the node, the second pulling high transistor being for pulling high the node; and a constant voltage amplifier, having a first input terminal coupled to the first reference voltage, a second input terminal coupled to the load, and an output terminal coupled to the control terminal of the second pulling high transistor.

3. The current supply of claim 1, wherein the constant current controller comprising:

the first pulling high transistor, having a first terminal coupled to the power supply, a control terminal, and a second terminal coupled to the node, the first pulling high transistor being for pulling high the node; and a constant current amplifier, having a first input terminal coupled to a second reference voltage, a second input terminal coupled to the second terminal of the sensing transistor, a first output terminal coupled to the control terminal of the first pulling high transistor, and a second output terminal coupled to the control terminal of the pulling low transistor.

4. The current supply of claim 3, wherein the constant current amplifier comprising:

a first constant current source;

a first transistor, having a first terminal coupled to the first constant current source, a control terminal being as the second input terminal of the constant current amplifier, and a second terminal;

a second transistor, having a first terminal coupled to the first constant current source, a control terminal being as the first input terminal of the constant current amplifier, and a second terminal;

a second constant current source, coupled to the second terminal of the first transistor;

a third constant current source, coupled to the second terminal of the second transistor;

a third transistor, having a first terminal coupled to the power supply, a control terminal being as the first output terminal of the constant current amplifier, and a second terminal coupled to the second constant source, the second terminal of the third transistor further coupled to the control terminal thereof;

a fourth transistor, having a first terminal coupled to GND, a control terminal for being as the second output terminal of the constant current amplifier, and a second terminal coupled to the control terminal thereof; and a first current mirror, coupled to the power supply, the third constant current source, and the second terminal of the fourth transistor.

5. The current supply of claim 3, further comprising a first resistor coupled between the second input terminal of the constant current amplifier and GND.

6. The current supply of claim 4, wherein the first current mirror comprising:

a fifth transistor, having a first terminal coupled to the power supply, a control terminal coupled to the third constant current source, and a second terminal coupled to the third constant current source; and a sixth transistor, having a first terminal coupled to the power supply, a control terminal coupled to the third constant current source, and a second terminal coupled to the second terminal of the fourth transistor.

7. The current supply of claim 1, wherein the pulling low transistor is further coupled to GND.

8. The current supply of claim 1, further comprising a temperature controller for controlling and pulling low the second reference voltage to reduce the charge current provided by the driving transistor when a die temperature of the current supply rises.

9. The current supply of claim 8, wherein the temperature controller comprising:

a first operation amplifier, having a first input terminal coupled to a third reference voltage, a second input terminal and an output terminal;

a seventh transistor, having a first terminal coupled to the power supply, a control terminal coupled to the output terminal of the first operation amplifier, and a second terminal coupled to the second input terminal of the first operation amplifier;

a second operation amplifier, having a first input terminal coupled to a fourth reference voltage, a second input terminal coupled to a positive temperature coefficient voltage and an output terminal;

an eighth transistor, having a first terminal coupled to GND, a control terminal coupled to the output terminal of the second operation amplifier, and a second terminal coupled to the second reference voltage; and a voltage divider, coupled to the second input terminal of the first operation amplifier and the second terminal of the seventh transistor;

wherein when the die temperature of the current supply is below a preset value, the voltage divider is for dividing a voltage at the second input terminal of the first operation amplifier to provide the second reference voltage;

when the die temperature of the current supply rises above the preset value, the second reference voltage is pulled low by the eighth transistor.

10. The current supply of claim 9, wherein the temperature controller further comprising:

a second resistor coupled between the second terminal of the seventh transistor and the second input terminal of the first operation amplifier;

a ninth transistor, having a first terminal coupled to GND, a control terminal coupled to the output terminal of the second operation amplifier, and a second terminal; and a second current mirror, coupled to the power supply, the second input terminal of the first operation amplifier, and the second terminal of the ninth transistor.

11. The current supply of claim 10, wherein if the die temperature of the current supply rises above the preset value, driving capabilities of the eighth transistor, the ninth transistor and the second current mirror increase with increasing temperature while that of the seventh transistor decreases with increasing temperature so that the second reference voltage is pulled down by the eighth transistor and accordingly the charge current provided by the driving transistor decreases.

12. A constant-current, constant-voltage and constant-temperature current supply for providing a charge current to a load, comprising:

a driving transistor, having a first terminal coupled to a power supply, a control terminal coupled to a node, and a second terminal coupled to the load, the driving transistor for providing the charge current to the load;

a sensing transistor, having a first terminal coupled to the power supply, a control terminal coupled to the node, and a second terminal;

a pulling low transistor, having a first terminal, a control terminal, and a second terminal coupled to the node, the pulling low transistor being for pulling low the node;

a constant voltage controller, coupled to the driving transistor, the sensing transistor and the pulling low transistor, wherein when a voltage across the load rises up and comes close to a first reference voltage, the constant voltage controller pulls up the node, controls the conduction state of the driving transistor and accordingly maintaining the voltage across the load at the first reference voltage;

a constant current controller, coupled to the driving transistor, the sensing transistor, the pulling low transistor and the constant voltage controller, wherein when the voltage across the load drops much lower than the first reference voltage, the constant current controller controls the node via a first pull high transistor and the pulling low transistor and thus limits the charge current to be constantly provided to the load; and a constant power controller, coupled to the constant current controller, for controlling power to be adjustably provided to the load and for reducing the charge current when a die temperature of the current supply raises.

13. The current supply of claim 12, wherein the constant voltage controller comprising:

a second pulling high transistor, having a first terminal coupled to the power supply, a control terminal, and a second terminal coupled to the node, the second pulling high transistor being for pulling high the node; and a constant voltage amplifier, having a first input terminal coupled to the first reference voltage, a second input terminal coupled to the load, and an output terminal coupled to the control terminal of the second pulling high transistor.

14. The current supply of claim 12, wherein the constant current controller comprising:

the first pulling high transistor, having a first terminal coupled to the power supply, a control terminal, and a second terminal coupled to the node, the first pulling high transistor being for pulling high the node; and a constant current amplifier, having a first input terminal coupled to a second reference voltage, a second input terminal coupled to the second terminal of the sensing transistor, a first output terminal coupled to the control terminal of the first pulling high transistor, and a second output terminal coupled to the control terminal of the pulling low transistor.

15. The current supply of claim 14, wherein the constant current amplifier comprising:
   a first constant current source;
   a first transistor, having a first terminal coupled to the first constant current source, a control terminal being as the second input terminal of the constant current amplifier, and a second terminal;
   a second transistor, having a first terminal coupled to the first constant current source, a control terminal being as the first input terminal of the constant current amplifier, and a second terminal;
   a second constant current source, coupled to the second terminal of the first transistor;
   a third constant current source, coupled to the second terminal of the second transistor;
   a third transistor, having a first terminal coupled to the power supply, a control terminal being as the first output terminal of the constant current amplifier, and a second terminal coupled to the second constant source, the second terminal of the third transistor further coupled to the control terminal thereof;
   a fourth transistor, having a first terminal coupled to GND, a control terminal for being as the second output terminal of the constant current amplifier, and a second terminal coupled to the control terminal thereof; and
   a first current mirror, coupled to the power supply, the third constant current source, and the second terminal of the fourth transistor.

16. The current supply of claim 14, further comprising a first resistor coupled between the second input terminal of the constant current amplifier and GND.

17. The current supply of claim 15, wherein the first current mirror comprising:
   a fifth transistor, having a first terminal coupled to the power supply, a control terminal coupled to the third constant current source, and a second terminal coupled to the third constant current source; and
   a sixth transistor, having a first terminal coupled to the power supply, a control terminal coupled to the third constant current source, and a second terminal coupled to the second terminal of the fourth transistor.

18. The current supply of claim 12, wherein the first terminal of the pulling low transistor is coupled to GND.

19. The current supply of claim 12, wherein the constant power controller comprising:
   a first operation amplifier, having a first input terminal coupled to a third reference voltage, a second input terminal and an output terminal;
   a seventh transistor, having a first terminal coupled to the power supply, a control terminal coupled to the output terminal of the first operation amplifier, and a second terminal coupled to the second input terminal of the first operation amplifier;
   a second operation amplifier, having a first input terminal coupled to a fourth reference voltage, a second input terminal coupled to a positive temperature coefficient voltage and an output terminal;
   a eighth transistor, having a first terminal coupled to GND, a control terminal coupled to the output terminal of the second operation amplifier, and a second terminal coupled to the second reference voltage; and
   a voltage divider, coupled to the second input terminal of the first operation amplifier and the second terminal of the seventh transistor;
   wherein when the die temperature of the current supply is below a preset value, the voltage divider is for dividing a voltage at the second input terminal of the first operation amplifier to provide the second reference voltage;
   when the die temperature of the current supply rises above the preset value, the second reference voltage is pulled low by the eighth transistor.

20. The current supply of claim 19, wherein the temperature controller further comprising:
   a second resistor coupled between the second terminal of the seventh transistor and the second input terminal of the first operation amplifier;
   a ninth transistor, having a first terminal coupled to GND, a control terminal coupled to the output terminal of the second operation amplifier, and a second terminal; and
   a second current mirror, coupled to the power supply, the second input terminal of the first operation amplifier, and the second terminal of the ninth transistor.

21. The current supply of claim 20, wherein when the die temperature of the current supply rises above the preset value, driving capabilities of the eighth transistor, the ninth transistor and the second current mirror increases with increasing temperature while that of the seventh transistor decreases with increasing temperature so that the second reference voltage is pulled down by the eighth transistor and accordingly the charge current provided by the driving transistor decreases.

\* \* \* \* \*